く12) United States Patent
Marupaduga et al.

(10) Patent No.: US 10,849,174 B1
(45) Date of Patent: Nov. 24, 2020

(54) MEDIA-CONFERENCING SERVICE AND INTERNET-ACCESS SERVICE FROM A FIFTH GENERATION NEW RADIO LONG TERM EVOLUTION (5GNR/LTE) WIRELESS ACCESS POINT

(71) Applicant: Sprint Communications Company L.P., Overland Park, KS (US)

(72) Inventors: Sreekar Marupaduga, Overland Park, KS (US); Rajveen Narendran, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 38 days.

(21) Appl. No.: 16/385,340

(22) Filed: Apr. 16, 2019

(51) Int. Cl.
*H04W 76/10* (2018.01)
*H04M 3/56* (2006.01)
*H04W 88/16* (2009.01)

(52) U.S. Cl.
CPC ............ *H04W 76/10* (2018.02); *H04M 3/567* (2013.01); *H04W 88/16* (2013.01)

(58) Field of Classification Search
CPC ....... H04W 4/70; H04W 48/00; H04W 76/18; H04W 76/27; H04L 47/41
See application file for complete search history.

(56) References Cited

U.S. PATENT DOCUMENTS 10,631,358 B1 * 4/2020 Fang ................... H04B 7/0473
10,681,598 B1 * 6/2020 Sitaram ................ H04W 36/26

| | | | |
|---|---|---|---|
| 2017/0034749 A1 * | 2/2017 | Chandramouli | H04W 36/14 |
| 2018/0227978 A1 | 8/2018 | Keller et al. | |
| 2018/0308509 A1 | 10/2018 | Balasubramanian et al. | |
| 2018/0376380 A1 * | 12/2018 | Leroux | H04W 76/18 |
| 2019/0053206 A1 * | 2/2019 | Babaei | H04W 72/042 |
| 2019/0058741 A1 | 2/2019 | Mufti et al. | |
| 2019/0075431 A1 | 3/2019 | Albasheir et al. | |
| 2019/0124572 A1 * | 4/2019 | Park | H04W 72/0446 |
| 2019/0245740 A1 * | 8/2019 | Kachhla | H04L 41/082 |
| 2019/0319858 A1 * | 10/2019 | Das | H04L 27/2637 |
| 2019/0364611 A1 * | 11/2019 | Centonza | H04W 76/16 |
| 2020/0196220 A1 * | 6/2020 | Centonza | H04W 48/00 |
| 2020/0204990 A1 * | 6/2020 | Raghunathan | H04L 12/1818 |

FOREIGN PATENT DOCUMENTS

CN 107425918 A 12/2017

* cited by examiner

*Primary Examiner* — Melanie Jagannathan

(57) ABSTRACT

In a wireless access point, a Long Term Evolution (LTE) Common Unit (CU) exchanges media-conferencing data with an LTE Distributed Unit (DU). The LTE DU exchanges the media-conferencing data User Equipment (UEs). The LTE CU determines a media-conferencing load. Based the media-conferencing load, the LTE CU determines a Fifth Generation New Radio (5GNR) Uplink (UL) allocation and an LTE UL allocation for an internet-access service. The LTE CU transfers LTE signaling and 5GNR signaling for delivery to the UEs. The LTE DU receives LTE UL internet data from the UEs per the LTE UL allocation and transfers the LTE UL internet data to the LTE CU. The 5GNR DU receives 5GNR UL internet data from the UEs per the 5GNR UL allocation and transfers the 5GNR UL internet data to the 5GNR CU. The LTE CU may also implement 5GNR/LTE downlink allocations for the internet-access service based on the media-conference load.

20 Claims, 7 Drawing Sheets

US 10,849,174 B1

MEDIA-CONFERENCING SERVICE AND INTERNET-ACCESS SERVICE FROM A FIFTH GENERATION NEW RADIO LONG TERM EVOLUTION (5GNR/LTE) WIRELESS ACCESS POINT

TECHNICAL BACKGROUND

Wireless user devices exchange wireless signals with wireless communication networks for data services like voice-calling and internet-access. The wireless communication networks have wireless access points that exchange the wireless signals with the wireless user devices. Popular forms of wireless networking comprise Long Term Evolution (LTE) and Fifth Generation New Radio (5GNR).

When an LTE user device attaches to an LTE access point, the LTE access point interacts with an LTE network core to authorize and establish an internet-access bearer and an Internet Protocol Multimedia Subsystem (IMS) bearer for the LTE user device. The LTE user device exchanges user data over the internet using the internet-access bearer. The LTE user device exchanges Session Initiation Protocol (SIP) signaling with an IMS server over the IMS bearer to establish media-conferencing bearers. The LTE user device exchanges conference data like live voice and video over the LTE media-conferencing bearers.

When a dual 5GNR/LTE user device attaches to an integrated 5GNR/LTE access point, the 5GNR/LTE access point interacts with the LTE core to authorize and establish a 5GNR/LTE internet-access bearer and LTE IMS bearer for the 5GNR/LTE user device. The 5GNR/LTE internet-access bearer uses parallel LTE and 5GNR links between the 5GNR/LTE UE and the 5GNR/LTE access point. The 5GNR/LTE user device uses the parallel LTE and 5GNR links to exchange user data over the internet. The 5GNR/LTE user device exchanges SIP signaling with the IMS server over the LTE IMS bearer to establish an LTE media-conferencing bearer. The 5GNR/LTE user device exchanges conference data like live voice and video over the LTE media-conferencing bearer.

Unfortunately, the 5GNR/LTE access point does not transfer internet data over the parallel LTE and 5GNR links to efficiently and effectively support the media-conferencing service.

TECHNICAL OVERVIEW

In a wireless access point, a Long Term Evolution (LTE) Common Unit (CU) exchanges media-conferencing data with an LTE Distributed Unit (DU). The LTE DU exchanges the media-conferencing data User Equipment (UEs). The LTE CU determines a media-conferencing load. Based on the media-conferencing load, the LTE CU determines a Fifth Generation New Radio (5GNR) Uplink (UL) allocation and an LTE UL allocation for an internet-access service. The LTE CU transfers LTE signaling and 5GNR signaling for delivery to the UEs. The LTE DU receives LTE UL internet data from the UEs per the LTE UL allocation and transfers the LTE UL internet data to the LTE CU. The 5GNR DU receives 5GNR UL internet data from the UEs per the 5GNR UL allocation and transfers the 5GNR UL internet data to the 5GNR CU. The LTE CU may also implement 5GNR/LTE downlink allocations for the internet-access service based on the media-conference load.

DETAILED DESCRIPTION

Figure 1:
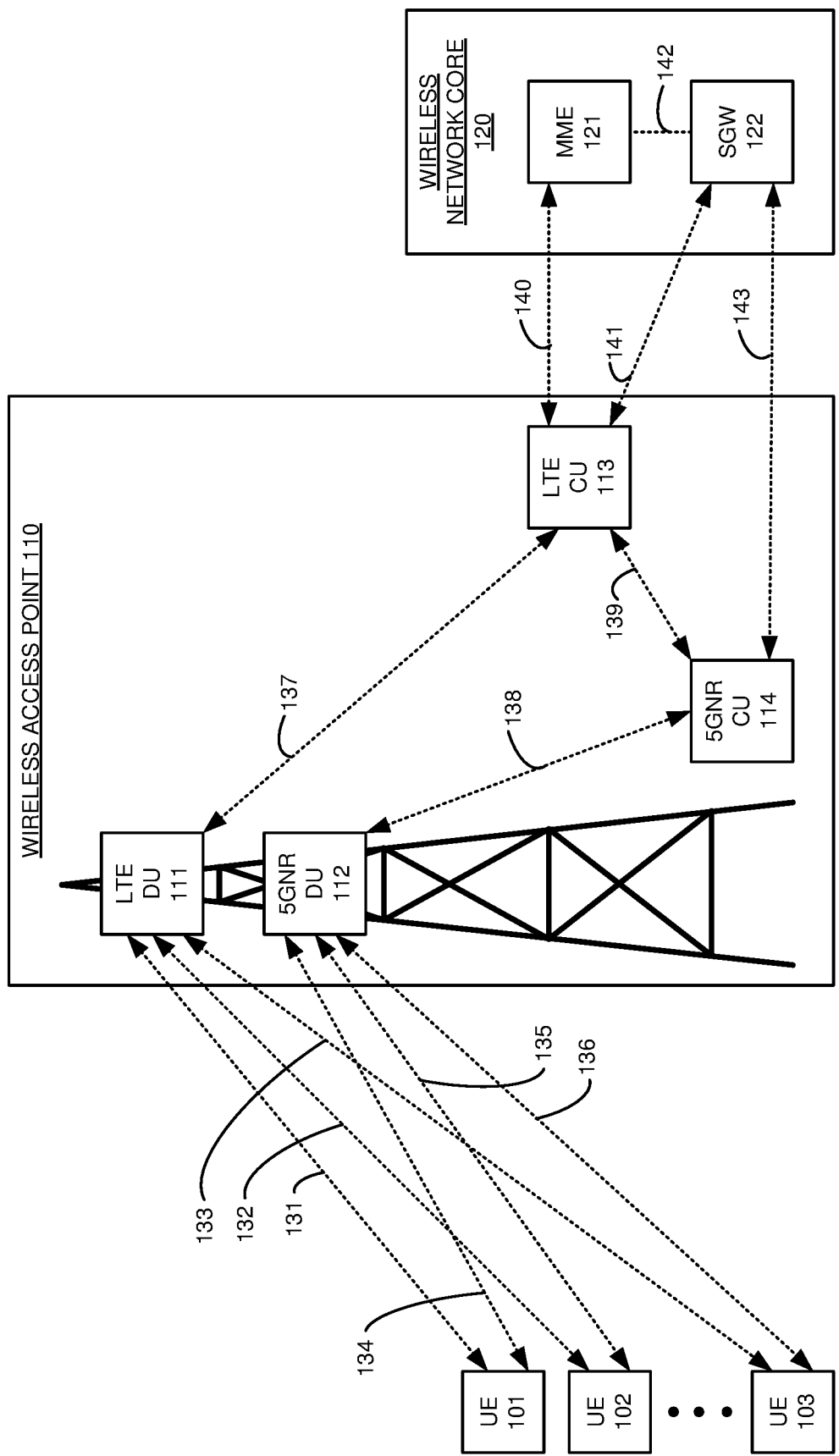
FIG. 1 illustrates a wireless access point that wirelessly serves User Equipment (UEs) with a media-conferencing service and an internet-access service.

FIG. 1 illustrates wireless access point 110 that wirelessly serves User Equipment (UEs) 101-103 with a media-conferencing service and an internet-access service. Wireless access point 110 comprises Long Term Evolution (LTE) Distributed Unit (DU) 111, Fifth Generation New Radio (5GNR) DU 112, LTE Common Unit (CU) 113, and 5GNR CU 114. Wireless network core comprises Mobility Management Entity (MME) 121 and Serving Gateway (SGW) 122. The number of UEs that are depicted on FIG. 1 has been restricted for clarity, and wireless access point 110 serves many more UEs that are like UEs 101-103.

UEs 101-103 and LTE DU 111 communicate over respective LTE links 131-133. UEs 101-103 and 5GNR DU 112 communicate over respective 5GNR links 134-136. LTE DU 111 and LTE CU 113 communicate over LTE link 137. 5GNR DU 112 and 5GNR CU 114 communicate over 5GNR link 138. LTE CU 113 and 5GNR CU 114 communicate over X2 link 139. LTE CU 113 and MME 121 communicate over LTE link 140. LTE CU 113 and SGW 122 communicate over LTE link 141. MME 121 and SGW 122 communicate over LTE link 142. In some examples, 5GNR CU 114 and SGW 122 communicate over S1 link 143, although S1 link 143 is omitted in other examples.

UEs 101-103 might be phones, computers, robots, vehicles, sensors, and/or the like. UEs 101-103 comprise radio circuitry and user circuitry. The radio circuitry comprises antennas, modulators, amplifiers, filters, digital/analog interfaces, processing circuitry, memory circuitry, and bus circuitry. The user circuitry comprises processing circuitry, memory circuitry, bus circuitry, user interfaces, and the like. The memory circuitry stores software that includes operating systems, network applications, and user applications. The network applications comprise Physical Layer (PHY), Media Access Control (MAC), Radio Link Control (RLC), Packet Data Convergence Protocol (PDCP), Radio Resource Control (RRC), and Service Data Application Protocol (SDAP), or some other networking protocol stack. The processing circuitry executes the operating systems, network applications, and user applications to wirelessly exchange user data and network signaling with wireless access point 110.

Wireless access point 110 comprises transceiver circuitry and networking circuitry. The transceiver circuitry comprises antennas, modulators, amplifiers, filters, digital/analog interfaces, processing circuitry, and memory. The processing circuitry comprises Digital Signal Processors (DSPs), Central Processing Units (CPUs), Graphical Processing Units (GPUs), Field Programmable Gate Arrays (FPGAs), Application Specific Integrated Circuits (ASICs) and/or the like. The memory circuitry comprises Random Access Memory (RAM), flash memory, disk drives, and/or the like. The memory circuitry stores software like operating systems and network applications. The network applications comprise PHY, MAC, RLC, PDCP, RRC, and SDAP or some other network protocol stack. The processing circuitry executes the operating systems and network applications to wirelessly exchange user data and network signaling with UEs 101-103 and to exchange user data and network signaling with wireless network core 120.

Wireless network core 120 comprises processing circuitry, memory circuitry, bus interfaces, and I/O interfaces. The processing circuitry comprises DSPs, CPUs, GPUs, FPGAs, ASICs, and/or the like. The memory circuitry includes RAM, flash memory, disk drives, and/or the like. The memory stores software like operating systems, virtual layers, and virtual network elements. The virtual layers comprise operating systems, hypervisors, virtual switches, virtual machines, and the like. The virtual network elements comprise MME 121, SGW 122, and the like. The processing circuitry executes the operating systems, virtual layers, and network elements to exchange the user data and network signaling with wireless access point 110.

Wireless access point 110 wirelessly serves UEs 101-103 with a media-conferencing service. UEs 101-103 and LTE DU 111 wirelessly exchange media conference data and signaling over LTE links 131-133. LTE DU 111 and LTE CU 113 exchange the conference data and signaling over LTE link 137. LTE CU 113 and MME 121 exchange conference signaling over LTE link 140. LTE CU 113 and SGW 122 exchange conference data over LTE link 141. MME 121 and SGW 122 exchange conference signaling over LTE link 142.

LTE CU 113 determines media-conferencing load like the amount of UEs, links, resource blocks, and the like that currently serve the media-conferencing service. Based on the media-conferencing load, LTE CU 113 determines allocations between LTE and 5GNR for the internet-access service. LTE CU 113 increases the 5GNR allocation and decreases the LTE allocation when the media-conferencing load increases. LTE CU 113 decreases the 5GNR allocation and increases the LTE allocation when the media-conferencing load decreases. The allocations comprise a 5GNR Uplink (UL) allocation, LTE UL allocation, 5GNR Downlink (DL) allocation, and LTE DL allocation. LTE CU 112 transfers LTE signaling to LTE DU 111 indicating the LTE UL/DL allocations. LTE DU 111 transfers LTE signaling to UEs 101-103 indicating the LTE UL/DL allocations. LTE CU 112 transfers 5GNR signaling to 5GNR CU 114 indicating the 5GNR UL/DL allocations. 5GNR CU 114 transfers 5GNR signaling to 5GNR DU 112 indicating the 5GNR UL/DL allocations. 5GNR DU 112 transfers 5GNR signaling to UEs 101-103 indicating the 5GNR UL/DL allocations.

Wireless access point 110 wirelessly serves UEs 101-103 with the internet-access service per the 5GNR/LTE UL/DL allocations. UEs 101-103 and LTE DU 111 wirelessly exchange internet-access data and signaling over LTE links 131-133 per the LTE UL/DL allocations. UEs 101-103 and 5GNR DU 112 wirelessly exchange internet-access data and signaling over 5GNR links 134-136 per the 5GNR UL/DL allocations. For example, the LTE UL allocation might be 30% and the 5GNR UL allocation might be 70%, so 30% of the UL internet data traverses LTE links 131-133 and 70% of the UL internet data traverses 5GNR links 134-136. LTE DU 111 and LTE CU 113 exchange LTE internet-access data and signaling over LTE link 137. 5GNR DU 112 and 5GNR CU 114 exchange 5GNR internet-access data and signaling over 5GNR link 138.

LTE CU 113 and 5GNR CU 114 exchange internet-access data and signaling over X2 link 139 per the 5GNR UL/DL allocations. For example, the LTE DL allocation might be 20% and the 5GNR DL allocation might be 80%, so 20% of the DL internet data traverses LTE link 137 and 80% of the DL internet data traverses X2 link 139. LTE CU 113 and MME 121 exchange internet-access signaling over LTE link 140. LTE CU 113 and SGW 122 exchange internet-access data over LTE link 141. MME 121 and SGW 122 exchange internet-access signaling over LTE link 142. In some examples, 5GNR CU 114 and SGW 122 exchange internet-access data over 51 link 143.

Advantageously, 5GNR/LTE access point 110 transfers the internet-access data over parallel 5GNR/LTE links 131-136 and 137-138 to efficiently and effectively support the media-conferencing service.

Figure 2:
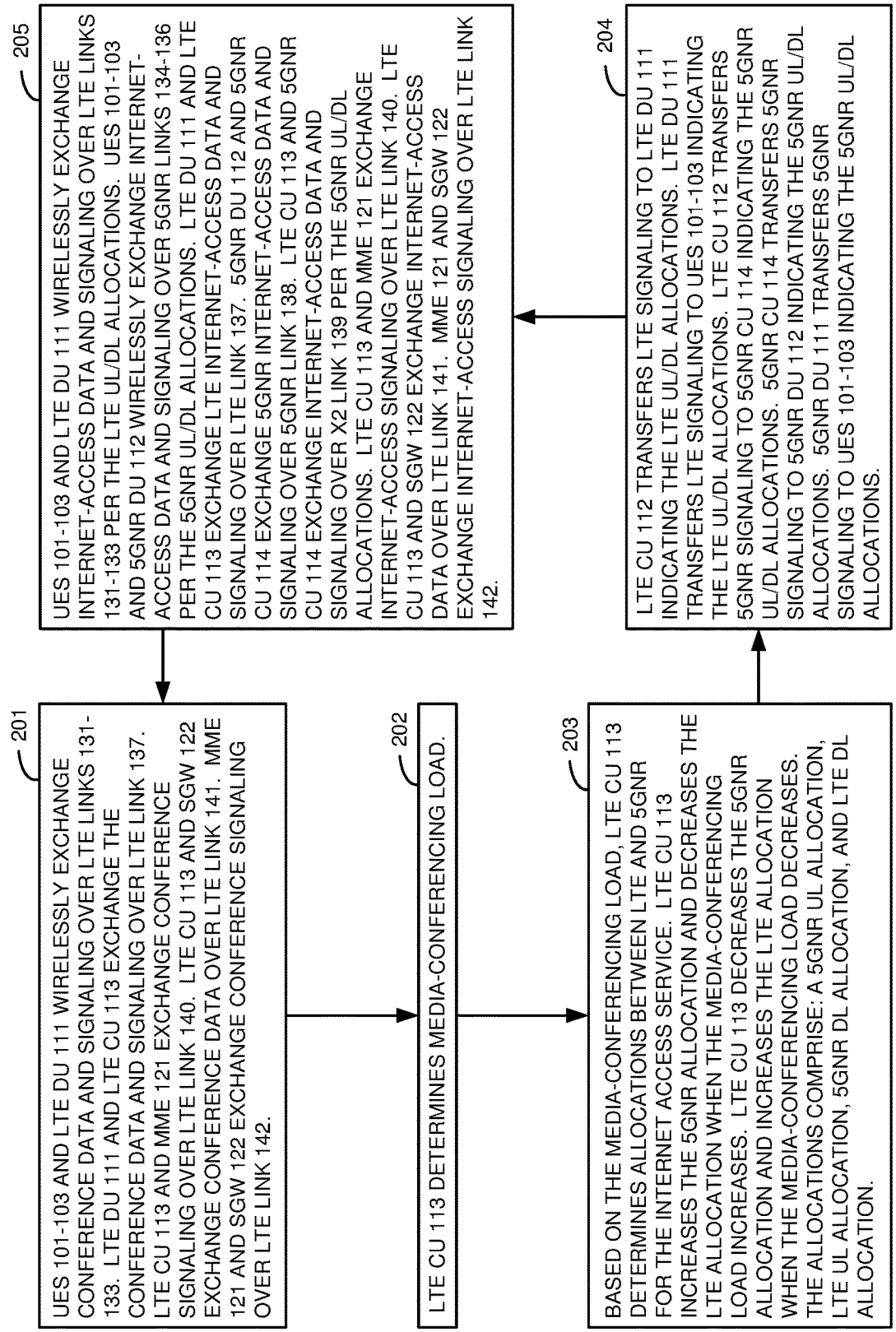
FIG. 2 illustrates the operation of the wireless access point to wirelessly serve the UEs with the media-conferencing service and the internet-access service.

FIG. 2 illustrates the operation of wireless access point 110 to wirelessly serve UEs 101-103 with the media-conferencing service and the internet-access service. UEs 101-103 and LTE DU 111 wirelessly exchange conference data and signaling over LTE links 131-133 (201). LTE DU 111 and LTE CU 113 exchange the conference data and signaling over LTE link 137. LTE CU 113 and MME 121 exchange conference signaling over LTE link 140. LTE CU 113 and SGW 122 exchange conference data over LTE link 141. MME 121 and SGW 122 exchange conference signaling over LTE link 142.

LTE CU 113 determines media-conferencing load like the amount of UEs, links, resource blocks, and the like that serve media-conferencing (202). Based on the media-conferencing load, LTE CU 113 determines allocations between LTE and 5GNR for the internet access service (203). For example, LTE CU 113 may enter a data structure with the media-conference load value to yield the LTE and 5GNR UL and DL allocations. LTE CU 113 increases the 5GNR allocation and decreases the LTE allocation when the media-conferencing load increases. LTE CU 113 decreases the 5GNR allocation and increases the LTE allocation when the media-conferencing load decreases. The allocations comprise: a 5GNR UL allocation, LTE UL allocation, 5GNR DL allocation, and LTE DL allocation.

LTE CU 112 transfers LTE signaling to LTE DU 111 indicating the LTE UL/DL allocations (204). LTE DU 111 transfers LTE signaling to UEs 101-103 indicating the LTE UL/DL allocations. LTE CU 112 transfers 5GNR signaling to 5GNR CU 114 indicating the 5GNR UL/DL allocations. 5GNR CU 114 transfers 5GNR signaling to 5GNR DU 112 indicating the 5GNR UL/DL allocations. 5GNR DU 111 transfers 5GNR signaling to UEs 101-103 indicating the 5GNR UL/DL allocations.

UEs 101-103 and LTE DU 111 wirelessly exchange internet-access data and signaling over LTE links 131-133 per the LTE UL/DL allocations (205). UEs 101-103 and 5GNR DU 112 wirelessly exchange internet-access data and signaling over 5GNR links 134-136 per the 5GNR UL/DL allocations. LTE DU 111 and LTE CU 113 exchange LTE internet-access data and signaling over LTE link 137. 5GNR DU 112 and 5GNR CU 114 exchange 5GNR internet-access data and signaling over 5GNR link 138. LTE CU 113 and 5GNR CU 114 exchange internet-access data and signaling over X2 link 139 per the 5GNR UL/DL allocations. LTE CU 113 and MME 121 exchange internet-access signaling over LTE link 140. LTE CU 113 and SGW 122 exchange internet-access data over LTE link 141. MME 121 and SGW 122 exchange internet-access signaling over LTE link 142. The operation repeats (201).

Figure 3:
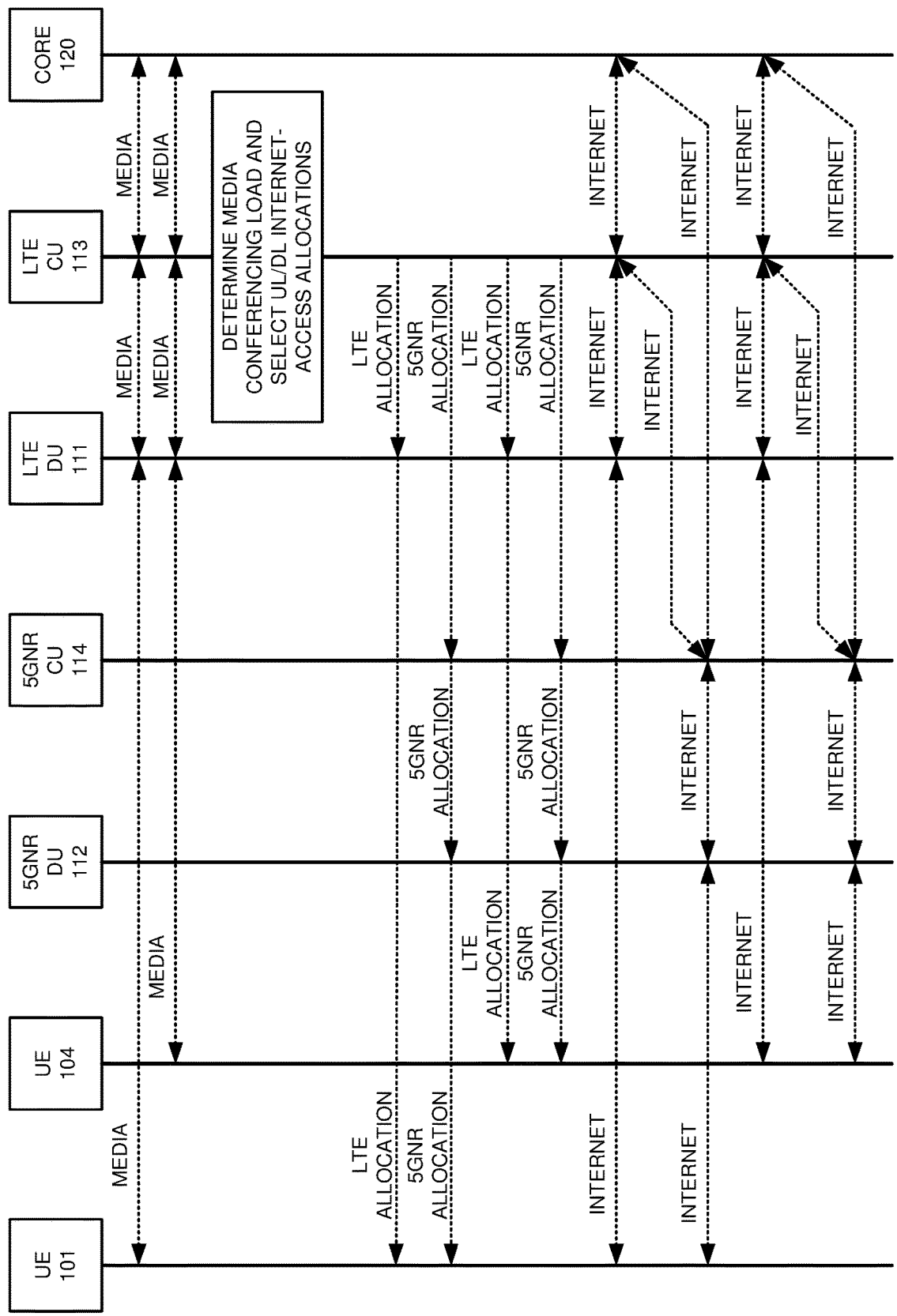
FIG. 3 illustrates the operation of the wireless access point to wirelessly serve the UEs with the media-conferencing service and the internet-access service.

FIG. 3 illustrates the operation of wireless access point 110 to wirelessly serve UE 101 and UE 104 with the media-conferencing service and the internet-access service. UE 101 and LTE DU 111 wirelessly exchange media data for the media-conferencing service. UE 104 and LTE DU 111 wirelessly exchange media data the media-conferencing service. LTE DU 111 and LTE CU 113 exchange the media data. LTE CU 113 and network core 120 exchange the media data.

LTE CU 113 determines the media-conferencing load like a number of media-conferencing UEs. Based on the media-conferencing load, LTE CU 113 determines allocations between LTE and 5GNR for the internet-access service for UEs 101 and 104. LTE CU 112 transfers the LTE UL/DL allocations to LTE DU 111. LTE DU 111 transfers the LTE UL/DL allocations to UEs 101 and 104. LTE CU 112 transfers the 5GNR UL/DL allocations to 5GNR CU 114. 5GNR CU 114 transfers the 5GNR UL/DL allocations to 5GNR DU 112. 5GNR DU 112 transfers the 5GNR UL/DL allocations to UEs 101 and 104.

UE 101 and LTE DU 111 wirelessly exchange internet data per the LTE UL/DL allocations. LTE DU 111 and LTE CU 113 exchange internet data. LTE CU 113 and core 120 exchange internet data. UE 101 and 5GNR DU 112 wirelessly exchange internet data per the 5GNR UL/DL allocations. 5GNR DU 112 and 5GNR CU 114 exchange internet data. 5GNR CU 114 and LTE CU 113 exchange internet data per the 5GNR UL/DL allocations. In some examples, 5GNR CU 114 also exchanges internet data with core 120 per the 5GNR UL/DL allocations.

UE 104 and LTE DU 111 wirelessly exchange internet data per the LTE UL/DL allocations. LTE DU 111 and LTE CU 113 exchange internet data. LTE CU 113 and core 120 exchange internet data. UE 104 and 5GNR DU 112 wirelessly exchange internet data per the 5GNR UL/DL allocations. 5GNR DU 112 and 5GNR CU 114 exchange internet data. 5GNR CU 114 and LTE CU 113 exchange internet data per the 5GNR UL/DL allocations. In some examples, 5GNR CU 114 also exchanges internet data with core 120 per the 5GNR UL/DL allocations.

Figure 4:
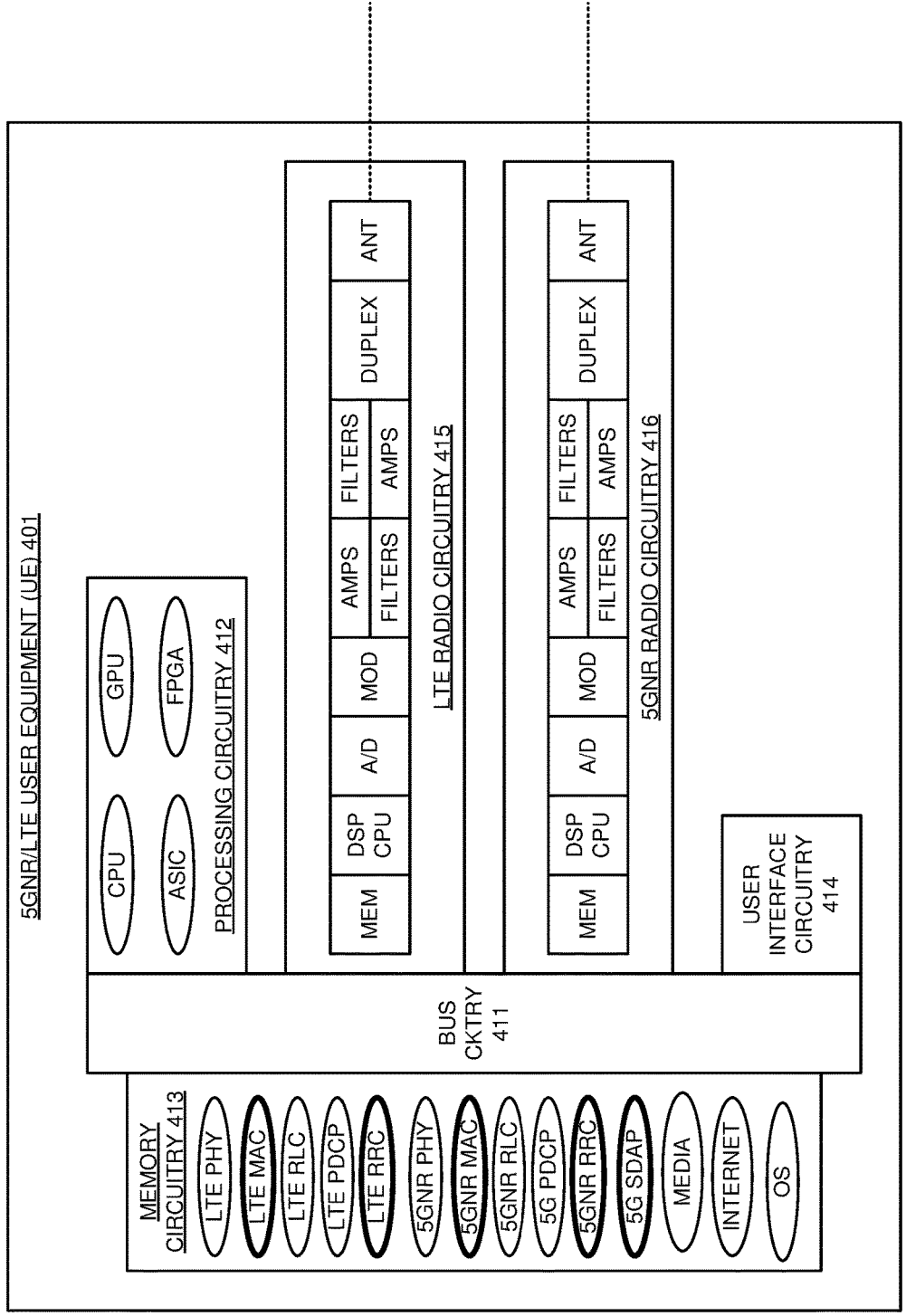
FIG. 4 illustrates a UE that is wirelessly served by a wireless access point with a media-conferencing service and an internet-access service.

FIG. 4 illustrates 5GNR/LTE UE 401 that is wirelessly served with a media-conferencing service and an internet-access service from 5GNR/LTE access points. 5GNR/LTE UE 401 is an example of UEs 101-103, although UEs 101-103 may differ. 5GNR/LTE UE 401 comprises bus circuitry (cktry) 411, processing circuitry 412, memory circuitry 413, user interface circuitry 414, LTE radio circuitry 415, and 5GNR radio circuitry 416. User interface circuitry 415 may comprise transceivers, machine controllers, graphic displays, sensors, cameras, and/or some other user components. Bus circuitry 411 couples processing circuitry 412, memory circuitry 413, user interface circuitry 414, LTE radio circuitry 415, and 5GNR radio circuitry 416.

Memory circuitry 413 comprises volatile and non-volatile memories like RAM, flash, disc, tape, and the like. Memory circuitry 413 stores an operating system (OS), network applications, and user applications for media-conferencing (MEDIA) and internet-access (INTERNET). The network applications comprise LTE PHY, LTE MAC, LTE RLC, LTE PDCP, LTE RRC, 5GNR PHY, 5GNR MAC, 5GNR RLC, 5GNR PDCP, 5GNR RRC, and 5GNR SDAP. Processing circuitry 412 comprises CPUs, GPUs, ASICs, FPGAs, and/or some other computer hardware. Processing circuitry 412 executes the operating system and user applications to generate user data and signaling. Processing circuitry 412 executes the operating system and the network applications to drive radio circuitry 415-416 to wirelessly exchange user data and network signaling with 5GNR/LTE access points. Radio circuitry 415-416 each comprise antennas (ANT), duplexers (DUPLEX), filters, amplifiers (AMPS), modulators (MOD), Analog/Digital interfaces (A/D), DSP, CPU, and memory (MEM). The antennas in radio circuitry 415-416 exchange wireless signals that transport user data and network signaling with 5GNR/LTE access points. In radio circuitry 415-416, the DSPs and CPUs execute software to drive the exchange of user data and network signaling between the antennas and memory circuitry 413.

RRC functions comprise authentication, security, handovers, status reporting, Quality-of-Service (QoS), system broadcasts, and network pages. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power headroom, channel quality, Hybrid Automatic Repeat Request (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

Through the operating system, the media-conferencing application and the internet-access application exchange user data and signaling with the LTE RRC. The LTE RRC maps between the user data/network signaling and Service Data Units (SDUs). The LTE RRC exchanges data SDUs with the 5GNR SDAP and the LTE PDCP per the 5GNR/LTE allocations. The LTE RRC exchanges signaling SDUs with the 5GNR RRC and the LTE PDCP. The 5GNR PDCP and the LTE PDCP map between the SDUs and Protocol Data Units (PDUs). The PDCPs exchange the PDUs with the 5GNR RLC and the LTE RLC. The RLCs map between the PDUs and MAC logical channels. The RLCs exchange user data and network signaling with the 5GNR MAC and the LTE MAC over the MAC logical channels. The MACs map between the MAC logical channels and MAC transport channels. The MACs exchange user data and network signaling with the PHY over the MAC transport channels. The 5GNR PHY and the LTE PHY map between the MAC transport channels and PHY transport channels. The PHYs exchange user data and network signaling with PHYs in 5GNR/LTE access points over the PHY transport channels.

The LTE PHY stores Uplink (UL) user data and network signaling in the memory in LTE radio circuitry 415. The 5GNR PHY stores UL user data and network signaling in the memory in 5GNR radio circuitry 416. In radio circuitry 415-416, the DSPs transfer corresponding UL signals to the analog/digital interface. The analog/digital interface converts the digital UL signals into analog UL signals for the modulators. The modulators up-convert the UL signals to their carrier frequencies. The amplifiers boost the UL signals for the filters which attenuate unwanted out-of-band energy. The filters transfer the UL signals through the duplexers to the antennas. The electrical UL signals drive the antennas to emit corresponding wireless UL signals that transport UL data and signaling to 5GNR/LTE access points.

In radio circuitry 415-416, the antennas receive wireless Downlink (DL) signals that transport user data and network signaling from 5GNR/LTE access points. The antennas transfer corresponding electrical DL signals through the duplexers to the amplifiers. The amplifiers boost the received DL signals for filters which attenuate unwanted energy. In modulation, demodulators down-convert the DL signals from their carrier frequencies. The analog/digital interfaces convert the analog DL signals into digital DL signals for the DSPs and CPUs. The DSPs and CPUs recover DL data from the DL signals that includes the user data and network signaling. The DSPs and CPUs transfer the DL user data and network signaling to memory circuitry 413. The network applications process the DL user data and network signaling and forward corresponding data and signaling to the media-conferencing application and the internet-access application through the operating system. The media-conferencing application and the internet-access application process the data and signaling to drive user interface circuitry 414 through the operating system.

Figure 5:
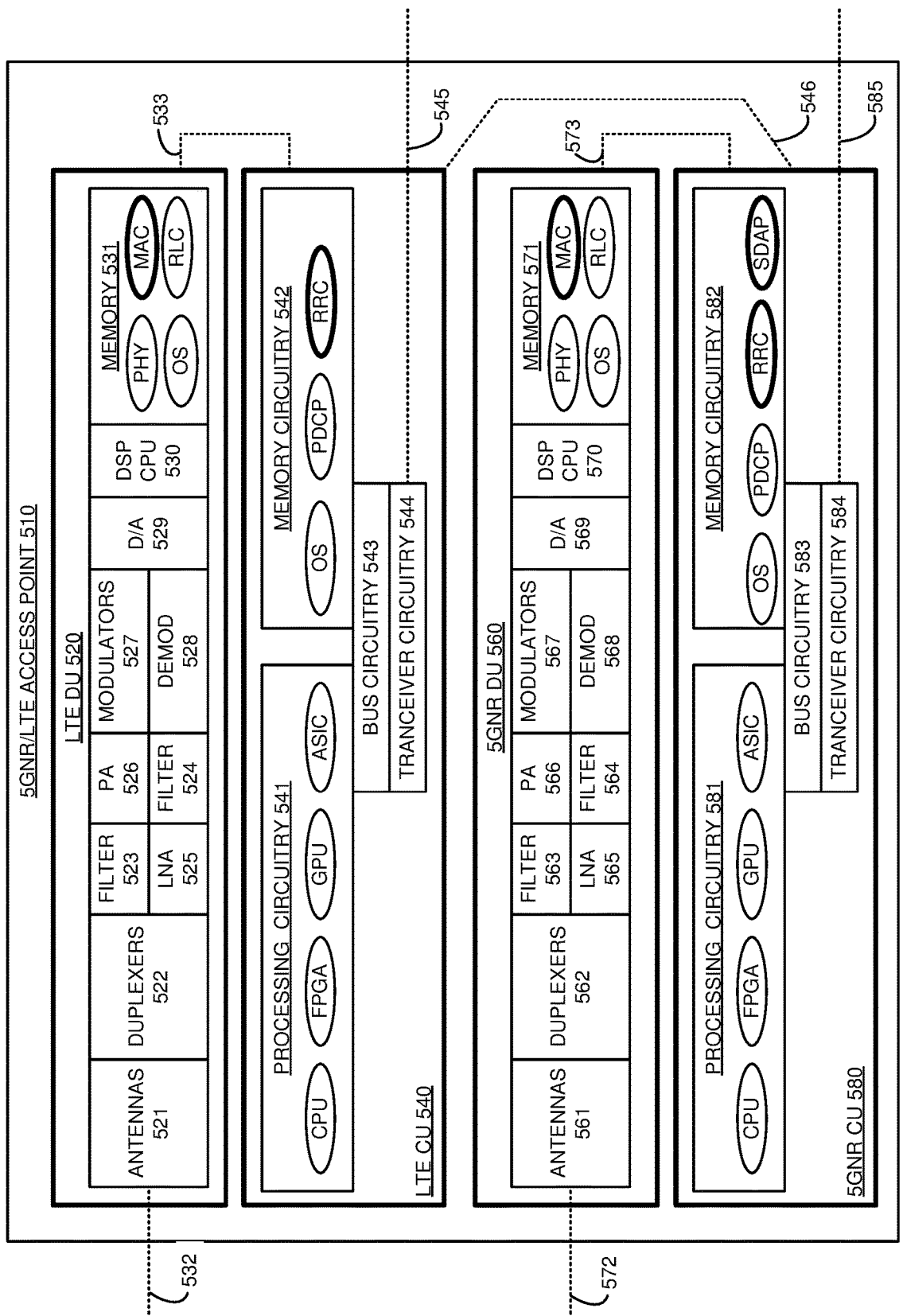
FIG. 5 illustrates a wireless access point to wirelessly serve UEs with a media-conferencing service and an internet-access service.

FIG. 5 illustrates 5GNR/LTE access point 510 to wirelessly serve UEs with a media-conferencing service and an internet-access service. 5GNR access point 510 comprises an example of wireless access point 110, although access point 110 may differ. 5GNR access point 510 comprises LTE DU 520, LTE CU 540, 5GNR DU 560, and 5GNR CU 580. LTE DU 520 comprises antennas 521, duplexers 522, filters 523-524, Low Noise Amplifier (LNA) 525, Power amplifier (PA) 526, modulators 527, de-modulators 528, D/A interfaces 529, DSP/CPU 530, and memory 531. LTE CU 540 comprises processing circuitry 541, memory circuitry 542, bus circuitry 543, and transceiver circuitry 544.

Memory 531 and memory circuitry 542 comprise volatile and non-volatile memories like RAM, flash, and the like. Processing circuitry 541 comprises CPUs, GPUs, ASICs, FPGAs, and/or some other computer circuitry. In this example, memory 531 stores an operating system and the network applications for LTE PHY, LTE MAC, and LTE RLC while memory circuitry 542 stores an operating system and the network applications for LTE PDCP and LTE RRC. Other LTE protocol split options could be used in other examples.

DSP/CPU 530 and processing circuitry 541 execute the operating systems and network applications to exchange user data and network signaling with UEs over links 532. DSP/CPU 530 and processing circuitry 541 execute the operating systems and network applications to exchange user data and network signaling with one another over links 533. Processing circuitry 541 executes its operating system and network applications to exchange user data and network signaling with 5GNR CU 580 over links 546. Processing circuitry 541 executes its operating system and network applications to exchange user data and network signaling with network cores over links 545.

5GNR DU 540 comprises antennas 561, duplexers 562, filters 563-564, LNA 565, PA 566, modulators 567, de-modulators 568, D/A interfaces 569, DSP/CPU 570, and memory 571. 5GNR CU 580 comprises processing circuitry 581, memory circuitry 582, bus circuitry 583, and transceiver circuitry 584. Memory 571 and memory circuitry 582 comprise volatile and non-volatile memories like RAM, flash, and the like. Processing circuitry 581 comprises CPUs, GPUs, ASICs, FPGAs, and/or some other computer circuitry. In this example, memory 581 stores an operating system and the network applications for 5GNR PHY, 5GNR MAC, and 5GNR RLC while memory circuitry 582 stores an operating system and the network applications 5GNR PDCP, 5GNR RRC, and 5GNR SDAP. Other 5GNR protocol split options could be used in other examples.

DSP/CPU 570 and processing circuitry 581 execute the operating systems and network applications to exchange user data and network signaling with UEs over 5GNR links 572. DSP/CPU 570 and processing circuitry 581 execute the operating systems and network applications to exchange user data and network signaling with one another over links 573. Processing circuitry 581 executes its operating system and network applications to exchange user data and network signaling with LTE CU 540 over links 546. In some examples, processing circuitry 581 executes its operating system and network applications to exchange user data and network signaling with network cores over links 585.

In LTE CU 540 and 5GNR CU 580, the RRC functions comprise authentication, security, handovers, status reporting, QoS, system broadcasts, and network pages. SDAP functions comprise QoS marking and flow control. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power headroom, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/de-scrambling, modulation mapping/de-mapping, channel estimation/equalization, FFTs/IFFTs, channel coding/decoding, layer mapping/de-mapping, precoding, DFTs/IDFTs, and RE mapping/de-mapping.

In LTE CU 540, the LTE RRC maps between user data/network signaling and SDUs. The LTE RRC exchanges data SDUs with the 5GNR SDAP over links 546 and with the LTE PDCP per the 5GNR/LTE allocations. The LTE RRC exchanges signaling SDUs with the 5GNR RRC over links 546 and the LTE PDCP. The 5GNR PDCP and the LTE PDCP map between the SDUs and Protocol Data Units (PDUs). The LTE PDCP exchanges the PDUs with the LTE RLC over links 533. The 5GNR PDCP exchanges the PDUs with the 5GNR RLC over links 573. The RLCs map between the PDUs and MAC logical channels. The RLCs exchange user data and network signaling with the 5GNR MAC and the LTE MAC over the MAC logical channels. The MACs map between the MAC logical channels and MAC transport channels. The MACs exchange user data and network signaling with the PHY over the MAC transport channels. The 5GNR PHY and the LTE PHY map between the MAC transport channels and PHY transport channels. The PHYs exchange user data and network signaling with PHYs in 5GNR/LTE access points over the PHY transport channels.

In LTE DU 520 and 5GNR DU 560, antennas 521 and 561 receive wireless UL signals that transport user data and network signaling from UEs. Antennas 521 and 561 transfer corresponding electrical UL signals through the duplexers 522 and 562 to LNAs 525 and 565. LNAs 525 and 565 boost the received UL signals for filters 524 and 564 which attenuate unwanted energy. Demodulators 528 and 568 down-convert the UL signals from their carrier frequencies. D/As 529 and 569 convert the analog UL signals into digital UL signals for DSP/CPUs 530 and DSP/CPUs 570. DSP/CPUs 530/570 execute the network applications to transfer the DL user data and network signaling to memory circuitry 542 over links 533. In LTE CU 540 and 5GNR CU 580, the network applications process the UL user data and network signaling and transfer UL user data and network signaling to network cores over links 546, links 545, and possibly links 585.

In LTE CU 540 and 5GNR CU 580, the network applications receive DL user data and network signaling over links 546, links 545, and possibly links 585. Circuitry 543-544 and 583-584 transfer the DL user data and network signaling to memory circuitry 582. LTE CU 540 executes the operating system and user applications to transfer DL user data and network signaling per the 5GNR/LTE allocations from memory circuitry 542 to memory 531 over links 533 and from memory circuitry 542 to memory circuitry 582 over links 546. In LTE DU 520 and 5GNR DU 560, DSP/CPU 530 and DSP/CPU 570 execute the operating systems and network applications to transfer corresponding DL signals to the D/A 529 and D/A 569. D/A 529 and D/A 569 convert the digital DL signals into analog DL signals for modulators 527 and 567. Modulators 527 and 567 up-convert the DL signals to their carrier frequencies. PAs 526 and 566 boost the DL signals for filters 523 and 563 which attenuate unwanted out-of-band energy. Filters 523 and 563 transfer the DL signals through duplexers 522 and 562 to antennas 521 and 561. The electrical UL signals drive antennas 521 and 561 to emit corresponding wireless DL signals that transport DL user data and network signaling to 5GNR/LTE UEs.

LTE DU 520 and UEs wirelessly exchange media conference data and signaling over links 532. LTE DU 520 and LTE CU 540 exchange the conference data and signaling over link 533. The LTE RRC in LTE CU 540 and an MME in a network core exchange conference signaling over link 545. The LTE RRC in LTE CU 540 and an SGW in a network core exchange conference data over link 545.

The LTE RRC in LTE CU 540 determines media-conferencing load like the average percent of available resource blocks that are used for the media-conferencing service. Based on the media-conferencing load, the LTE RRC in LTE CU 540 determines UL and DL allocations between LTE and 5GNR for the internet-access service. For example, the LTE RRC may enter a data structure with the number of voice-conference connections to yield the LTE UL allocation, LTE DL allocation, 5GNR UL allocation, and 5GNR DL allocation. The LTE RRC in LTE CU 540 transfers DL user data and signaling to the LTE PDCP per the LTE DL allocation and transfers DL user data and signaling to the 5GNR SDAP/RRC per the 5GNR DL allocation. For example, the LTE DL allocation might be 30% and the 5GNR DL allocation might be 70%. In access point 510, the LTE RRC transfers 70% of the DL internet data over 5GNR links 546, 5GNR CU 580, 5GNR links 573, 5GNR DU 560, and 5GNR links 572. The LTE RRC transfers 30% of the DL internet data over LTE CU 560, LTE links 533, LTE DU 520, and LTE links 532.

For the UL, the LTE RRC in LTE CU 540, transfers RRC signaling to the LTE RRCs in the UEs indicating the LTE UL allocation and the 5GNR UL allocation. In the UEs, the LTE RRCs transfer UL user data and network signaling to the LTE PDCP per the LTE UL allocation and transfer UL user data and network signaling to the 5GNR RRC/SDAP per the 5GNR UL allocation. For example, the LTE UL allocation might be 20% and the 5GNR UL allocation might be 80%. In the UEs, the LTE RRCs transfer 20% of the UL internet data over LTE links 532 and transfer 80% of the UL internet data over 5GNR links 572.

Figure 6:
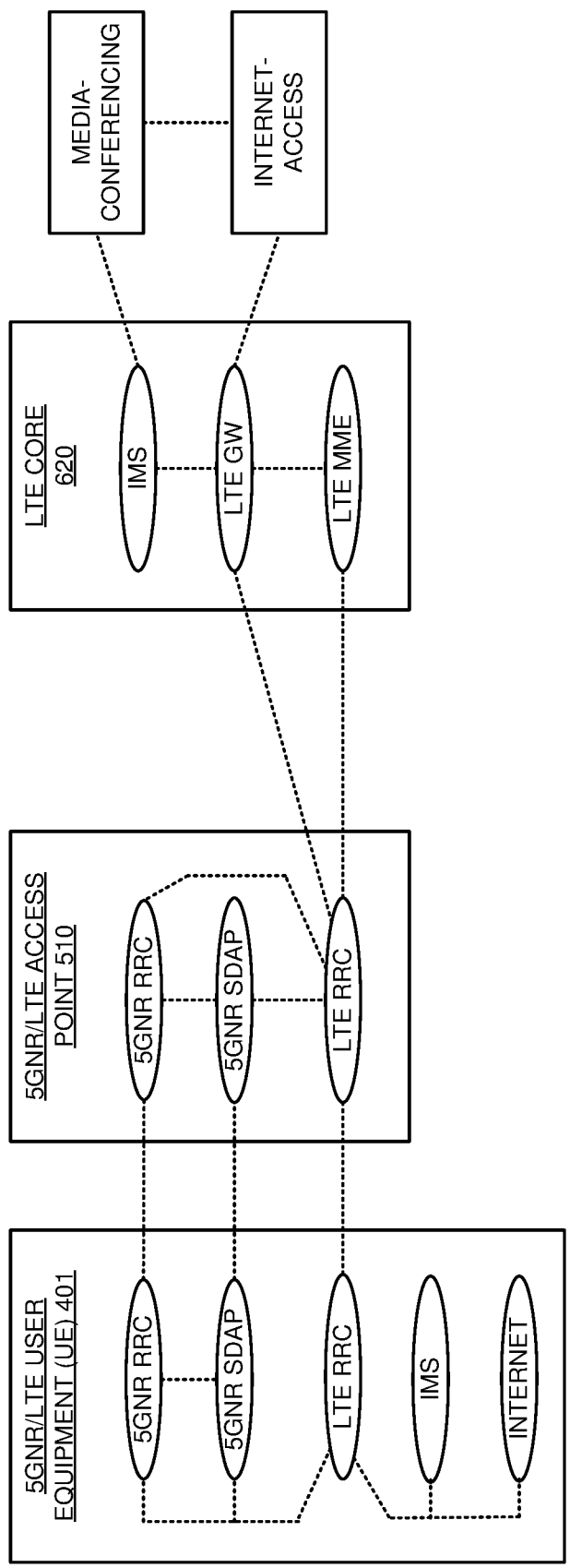
FIG. 6 illustrates the operation of the UE, wireless access point, and network core to serve the UE with the media-conferencing service and the internet-access service.

FIG. 6 illustrates the operation of 5GNR/LTE UE 401, 5GNR/LTE access point 510, and LTE network core 620 to serve 5GNR/LTE UE 401 with the media-conferencing and internet-access. For clarity, some circuitry and software from FIGS. 4-5 is omitted from FIG. 6. At power-up, the LTE RRC in 5GNR/LTE UE 401 attaches to the LTE RRC in 5GNR/LTE access point 510 and then to the LTE MME in LTE core 620. The LTE MME authorizes UE 401 for the media-conferencing and internet-access services. The LTE MME directs the LTE RRC in 5GNR/LTE access point 510 and an LTE Gateway (GW) to establish an internet-access bearer and an Internet-Protocol Multimedia Subsystem (IMS) bearer for UE 401.

The LTE RRC in 5GNR/LTE access point 510 signals the LTE RRC in 5GNR/LTE UE 401 to establish an LTE internet-access bearer and an LTE IMS bearer. The LTE RRC in 5GNR/LTE access point 510 directs the 5GNR RRC in access point 510 to establish a 5GNR internet-access bearer. The LTE RRC in 5GNR/LTE UE 401 directs the 5GNR RRC in UE 401 to establish the 5GNR internet-access bearer. The 5GNR RRC in access point 510 signals the 5GNR RRC in UE 401 to establish the 5GNR internet-access bearer over the 5GNR SDAPs. The internet-access application in UE 401 may exchange internet data over the LTE internet-access bearer through the LTE RRCs and LTE GW and over the 5GNR internet-access bearer through the 5GNR SDAPs and LTE GW. In this example, the 5GNR internet-access bearer between the 5GNR SDAP in access point 510 and the LTE GW traverses the LTE RRC in access point 510.

The IMS application in UE 401 may exchange conference signaling like Session Initiation Protocol (SIP) with the IMS in network core 620 over the LTE IMS bearer through the LTE RRCs and LTE GW. In response to the signaling, the IMS directs the LTE MME to establish another media-conferencing bearer for UE 401. For example, UE may transfer a SIP INVITE to the IMS, and after IMS processing and SIP exchanges, the IMS directs the LTE MME to establish a Quality-of-Service (QoS) Class Indicator (QCI) 1 bearer for UE 401. The LTE MME directs the LTE GW and the LTE RRC in 5GNR/LTE access point 510 to establish the media-conferencing bearer for UE 401 like the QCI 1 bearer. The LTE RRC in 5GNR/LTE access point 510 signals the LTE RRC in 5GNR/LTE UE 401 to establish the media-conferencing bearer. The IMS application in UE 401 may exchange media-conference data like voice and/or video over the media-conferencing bearer through the LTE RRCs and LTE GW.

The LTE RRC in 5GNR/LTE access point 510 determines a media-conference load for the UEs it serves—like the average number of QCI 1 bearers. The LTE RRC translates the media-conference load into UL/DL allocations for LTE and 5GNR internet-access. For example, the LTE RRC may translate the average number of QCI 1 bearers into the following allocations for internet access: 10% LTE UL, 90% 5GNR UL, 30% LTE DL, and 70% 5GNR DL.

For the internet-access service, the LTE RRC in 5GNR/LTE access point 510 implements the allocations for the UEs that it serves. On the DL, the LTE RRC in access point 510 receives internet data. The LTE RRC in access point 510 routes the 5GNR DL data allocation to the 5GNR SDAP and correspondingly signals the 5GNR RRC to direct the transfer. The 5GNR SDAPs and RRCs in access point 510 and UE 401 signal and transfer the 5GNR DL data allocation from access point 510 to UE 401. The LTE RRC in in access point 510 signals the LTE RRC in UE 401 of the LTE DL allocation. The LTE RRC in in access point 510 then transfers the LTE DL data allocation to the LTE RRC in UE 401.

For the UL, the LTE RRC in access point 510 signals the LTE/5GNR UL allocations to the LTE RRC in 5GNR/LTE UE 401. The LTE RRC in UE 401 routes the 5GNR UL data allocation to the 5GNR SDAP and correspondingly signals the 5GNR RRC to direct the transfer. The 5GNR SDAPs and RRCs in UE 401 and access point 510 signal and transfer the 5GNR UL data allocation from UE 401 to access point 510. The 5GNR SDAP in access point 510 transfers the 5GNR UL data allocation to the LTE RRC in access point 510. The LTE RRC in access point 510 transfers the 5GNR UL data allocation to the LTE GW for internet-access.

Figure 7:
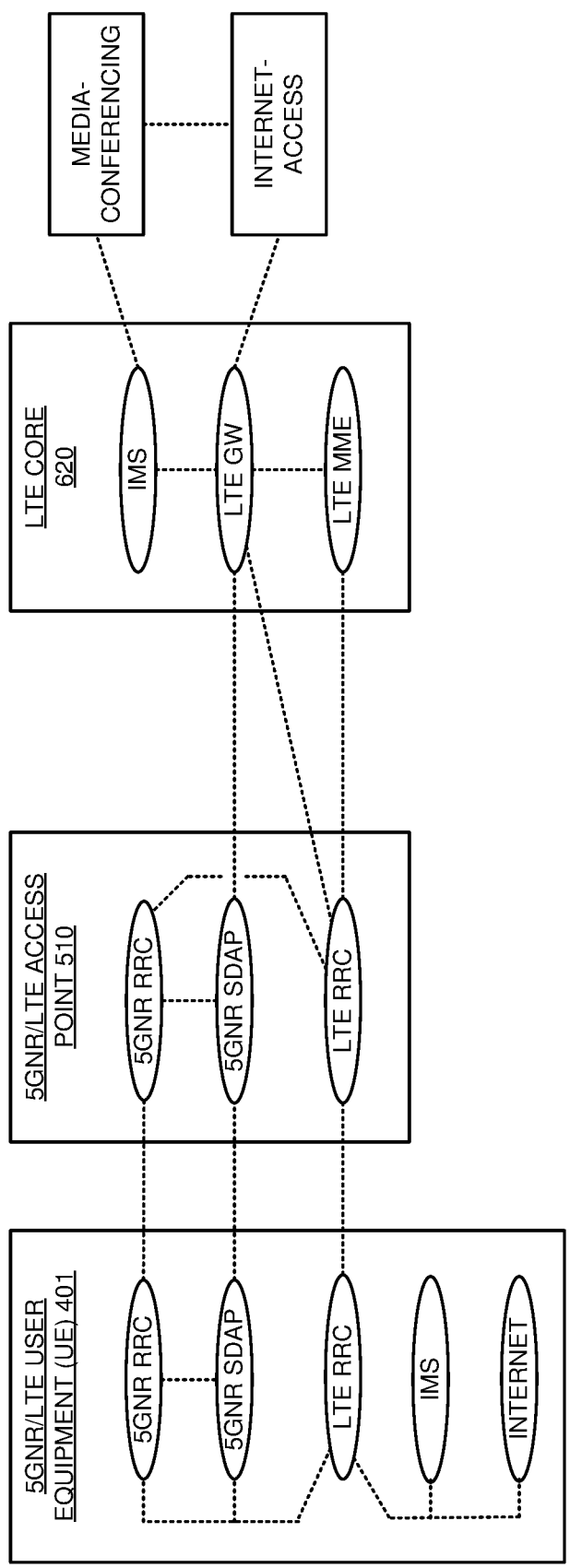
FIG. 7 illustrates the operation of the UE, wireless access point, and network core to serve the UE with the media-conferencing service and the internet-access service.

FIG. 7 illustrates the operation of 5GNR/LTE UE 401, 5GNR/LTE access point 510, and LTE network core 620 to serve 5GNR/LTE UE 401 with the media-conferencing and internet-access. For clarity, some circuitry and software from FIGS. 4-5 is omitted from FIG. 7. At power-up, the LTE RRC in 5GNR/LTE UE 401 attaches to the LTE RRC in 5GNR/LTE access point 510 and then to the LTE MME in LTE core 620. The LTE MME authorizes UE 401 for the media-conferencing and internet-access services. The LTE MME directs the LTE GW and the LTE RRC in 5GNR/LTE access point 510 to establish an internet-access bearer and an IMS bearer for UE 401.

The LTE RRC in 5GNR/LTE access point 510 signals the LTE RRC in 5GNR/LTE UE 401 to establish an LTE internet-access bearer and an LTE IMS bearer. The LTE RRC in 5GNR/LTE access point 510 directs the 5GNR RRC in access point 510 to establish a 5GNR internet-access bearer. The LTE RRC in 5GNR/LTE UE 401 directs the 5GNR RRC in UE 401 to establish the 5GNR internet-access bearer. The 5GNR RRC in access point 510 signals the 5GNR RRC in UE 401 to establish the 5GNR internet-access bearer over the 5GNR SDAPs. The internet-access application in UE 401 may exchange internet data over the LTE internet-access bearer through the LTE RRCs and LTE GW and over the 5GNR internet-access bearer through the 5GNR SDAPs and LTE GW. In this example, the 5GNR internet-access bearer between the 5GNR SDAP in access point 510 and the LTE GW is direct and does not traverse the LTE RRC in access point 510.

The IMS application in UE 401 may exchange conference signaling like SIP with the IMS in network core 620 over the LTE IMS bearer through the LTE RRCs and LTE GW. In response to the signaling, the IMS directs the LTE MME to establish another media-conferencing bearer for UE 401. For example, UE may transfer a SIP INVITE to the IMS, and after IMS processing and SIP exchanges, the IMS directs the LTE MME to establish a QCI 3 bearer for UE 401. The LTE MME directs the LTE GW and the LTE RRC in 5GNR/LTE access point 510 to establish the media-conferencing bearer for UE 401 like the QCI 3 bearer. The LTE RRC in 5GNR/LTE access point 510 signals the LTE RRC in 5GNR/LTE UE 401 to establish the media-conferencing bearer. The IMS application in UE 401 may exchange media-conference data like voice and/or video over the LTE media-conferencing bearer through the LTE RRCs and LTE GW.

The LTE RRC in 5GNR/LTE access point 510 determines a media-conference load for the UEs it serves—like the average number of QCI 3 bearers. The LTE RRC translates the media-conference load into UL/DL allocations for LTE and 5GNR internet-access. For example, the LTE RRC may translate the average number of QCI 3 bearers into the following allocations for internet access: 10% LTE UL, 90% 5GNR UL, 20% LTE DL, and 80% 5GNR DL.

For the internet-access service, the LTE RRC in 5GNR/LTE access point 510 implements the allocations for the UEs that it serves. On the DL, the LTE RRC in access point 510 signals the 5GNR/LTE DL allocations to the LTE MME. The LTE MME signals the 5GNR/LTE DL allocations for UE 401 to the LTE GW. The LTE RRC in access point 510 signals the LTE DL allocation to the LTE RRC in UE 401. The LTE RRC in access point 510 signals the 5GNR DL allocation to the 5GNR RRC in access point 510. The 5GNR RRC in access point 510 signals the 5GNR DL allocation to the 5GNR RRC in UE 401. The LTE GW receives DL internet data for UE 401 and routes the 5GNR DL allocation to the 5GNR SDAP in access point 510. The LTE GW routes the LTE DL allocation to the LTE RRC in access point 510. In access point 510, the 5GNR SDAP transfers the 5GNR DL allocation to the 5GNR SDAP in UE 401, and the LTE RRC transfers the LTE DL allocation to the LTE RRC in UE 401.

The LTE RRC in access point 510 signals the LTE/5GNR UL allocations to the LTE RRC in 5GNR/LTE UE 401. On the UL, the LTE RRC in UE 401 routes the 5GNR UL data allocation to the 5GNR SDAP and correspondingly signals the 5GNR RRC to direct the transfer. The 5GNR SDAPs and RRCs in UE 401 and access point 510 signal and transfer the 5GNR UL data allocation from UE 401 to access point 510. The 5GNR SDAP in access point 510 transfers the 5GNR UL data allocation to the LTE GW in LTE core 620. The LTE RRCs in UE 401 and access point 510 signal and transfer the LTE UL data allocation from UE 401 to access point 510. The LTE RRC in access point 510 transfers the LTE UL data allocation to the LTE GW in LTE core 620.

The wireless data network circuitry described above comprises computer hardware and software that form special-purpose wireless network circuitry to load balance internet-access data between 5GNR and LTE based on media-conferencing load. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless network circuitry wireless network circuitry to load balance internet-access data between 5GNR and LTE based on media-conferencing load.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless access point to wirelessly serve User Equipment (UEs) with a media-conferencing service and an internet-access service, the method comprising:
   a Long Term Evolution (LTE) Common Unit (CU) exchanging media-conferencing data for the media-conferencing service with an LTE Distributed Unit (DU);
   the LTE DU exchanging the media-conferencing data with the LTE CU and exchanging the media-conferencing data with the UEs;
   the LTE CU determining a media-conferencing load, and based on the media-conferencing load, determining a Fifth Generation New Radio (5GNR) Uplink (UL) allocation and an LTE UL allocation for the internet-access service, transferring LTE signaling to the LTE DU indicating the LTE UL allocation, and transferring 5GNR signaling to a 5GNR CU indicating the 5GNR UL allocation;
   the 5GNR CU receiving the 5GNR signaling and transferring the 5GNR signaling to a 5GNR DU;
   the LTE DU receiving the LTE signaling and transferring the LTE signaling to the UEs;
   the 5GNR DU receiving the 5GNR signaling and transferring the 5GNR signaling to the UEs;
   the LTE DU receiving LTE UL internet data from the UEs per the LTE UL allocation and transferring the LTE UL internet data to the LTE CU; and
   the 5GNR DU receiving 5GNR UL internet data from the UEs per the 5GNR UL allocation and transferring the 5GNR UL internet data to the 5GNR CU.

2. The method of claim 1 further comprising:
   the LTE CU determining a 5GNR Downlink (DL) allocation and an LTE DL allocation for the internet-access service based on the media-conferencing load wherein the 5GNR signaling indicates the 5GNR DL allocation and the LTE signaling indicates the LTE DL allocation;
   the LTE CU transferring LTE DL internet data to the LTE DU per the LTE DL allocation and transferring 5GNR DL internet data to the 5GNR CU per the 5GNR DL allocation; and
   the 5GNR CU transferring 5GNR DL internet data to the 5GNR DU; and
   the 5GNR DU receiving the 5GNR DL internet data from 5GNR CU and transferring the 5GNR DL internet data to the UEs.

3. The method of claim 1 further comprising the LTE CU transferring the LTE UL internet data for delivery to a network gateway.

4. The method of claim 1 further comprising the 5GNR CU transferring the 5GNR UL internet data for delivery to a network gateway.

5. The method of claim 1 further comprising:
   the 5GNR CU transferring the 5GNR UL internet data to the LTE CU; and
   the LTE CU transferring the 5GNR UL internet data for delivery to a network gateway.

6. The method of claim 1 further comprising the LTE CU exchanging the media-conferencing data with a network gateway.

7. The method of claim 1 wherein the media-conferencing service comprises a voice-calling service.

8. The method of claim 1 wherein the media-conferencing service comprises a video-conferencing service.

9. The method of claim 1 wherein the LTE CU determining the 5GNR UL allocation comprises increasing the 5GNR UL allocation when the media-conferencing load increases.

10. The method of claim 1 wherein the LTE CU determining the LTE UL allocation comprises decreasing the LTE UL allocation when the media-conferencing load increases.

11. A wireless access point to wirelessly serve User Equipment (UEs) with a media-conferencing service and an internet-access service, the wireless access point comprising:
    a Long Term Evolution (LTE) Common Unit (CU) configured to exchange media-conferencing data for the media-conferencing service with an LTE Distributed Unit (DU);
    the LTE DU configured to exchange the media-conferencing data with the LTE CU and exchange the media-conferencing data with the UEs;
    the LTE CU configured to determine a media-conferencing load, and based on the media-conferencing load, determine a Fifth Generation New Radio (5GNR) Uplink (UL) allocation and an LTE UL allocation for the internet-access service, transfer LTE signaling to the LTE DU indicating the LTE UL allocation, and transfer 5GNR signaling to a 5GNR CU indicating the 5GNR UL allocation;
    the 5GNR CU configured to receive the 5GNR signaling and transfer the 5GNR signaling to a 5GNR DU;
    the LTE DU configured to receive the LTE signaling and transfer the LTE signaling to the UEs;
    the 5GNR DU configured to receive the 5GNR signaling and transfer the 5GNR signaling to the UEs;
    the LTE DU configured to receive LTE UL internet data from the UEs per the LTE UL allocation and transfer the LTE UL internet data to the LTE CU; and
    the 5GNR DU configured to receive 5GNR UL internet data from the UEs per the 5GNR UL allocation and transfer the 5GNR UL internet data to the 5GNR CU.

12. The wireless access point of claim 11 further comprising:
    the LTE CU configured to determine a 5GNR Downlink (DL) allocation and an LTE DL allocation for the internet-access service based on the media-conferencing load wherein the 5GNR signaling indicates the 5GNR DL allocation and the LTE signaling indicates the LTE DL allocation;
    the LTE CU configured to transfer LTE DL internet data to the LTE DU per the LTE DL allocation and transfer 5GNR DL internet data to the 5GNR CU per the 5GNR DL allocation; and the 5GNR CU configured to transfer 5GNR DL internet data to the 5GNR DU; and the 5GNR DU configured to receive the 5GNR DL internet data from 5GNR CU and transfer the 5GNR DL internet data to the UEs.

13. The wireless access point of claim 11 further comprising the LTE CU configured to transfer the LTE UL internet data for delivery to a network gateway.

14. The wireless access point of claim 11 further comprising the 5GNR CU configured to transfer the 5GNR UL internet data for delivery to a network gateway.

15. The wireless access point of claim 11 further comprising:

the 5GNR CU configured to transfer the 5GNR UL internet data to the LTE CU; and the LTE CU configured to transfer the 5GNR UL internet data for delivery to a network gateway.

16. The wireless access point of claim 11 further comprising the LTE CU configured to exchange the media-conferencing data with a network gateway.

17. The wireless access point of claim 11 wherein the media-conferencing service comprises a voice-calling service.

18. The wireless access point of claim 11 wherein the media-conferencing service comprises a video-conferencing service.

19. The wireless access point of claim 11 wherein the LTE CU is configured to increase the 5GNR UL allocation when the media-conferencing load increases.

20. The wireless access point of claim 11 wherein the LTE CU is configured to decrease the LTE UL allocation when the media-conferencing load increases.

* * * * *